United States Patent
Guo et al.

(10) Patent No.: US 12,445,657 B1
(45) Date of Patent: Oct. 14, 2025

(54) DERIVING IN-LOOP FILTER PARAMETERS FOR VIDEO CODING

(71) Applicant: Zoom Video Communications, Inc., San Jose, CA (US)

(72) Inventors: Yi Guo, Hangzhou (CN); Zhichu He, Hangzhou (CN); Rui Li, Hangzhou (CN); Bo Ling, Saratoga, CA (US); Jing Wu, Hangzhou (CN); Minxia Yang, Hangzhou (CN); Shiyan Zhang, Hangzhou (CN); Yichen Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 62 days.

(21) Appl. No.: 18/383,798

(22) Filed: Oct. 25, 2023

Related U.S. Application Data

(60) Provisional application No. 63/528,230, filed on Jul. 21, 2023.

(51) Int. Cl.
*H04N 19/117* (2014.01)
*H04N 19/503* (2014.01)
*H04N 19/82* (2014.01)

(52) U.S. Cl.
CPC .......... *H04N 19/82* (2014.11); *H04N 19/117* (2014.11); *H04N 19/503* (2014.11)

(58) Field of Classification Search
CPC .... H04N 19/82; H04N 19/117; H04N 19/503; H01R 13/512; H01R 24/28
See application file for complete search history.

(56) References Cited

U.S. PATENT DOCUMENTS

| | | | | |
|---|---|---|---|---|
| 2014/0192869 | A1* | 7/2014 | Laroche | H04N 19/147 |
| | | | | 375/240.12 |
| 2019/0007680 | A1* | 1/2019 | Chen | H04N 19/15 |
| 2019/0052877 | A1* | 2/2019 | Zhang | H04N 19/124 |
| 2019/0141339 | A1* | 5/2019 | Madajczak | G06T 15/005 |
| 2019/0320196 | A1* | 10/2019 | Yu | H04N 19/52 |

(Continued)

OTHER PUBLICATIONS

"Alliance for Open Media", Retrieved from internet on Oct. 17, 2023 from: https://aomedia.googlesource.com/aom, 12 pages.

(Continued)

*Primary Examiner* — Md N Haque
(74) *Attorney, Agent, or Firm* — Kilpatrick Townsend & Stockton, LLP

(57) ABSTRACT

Deriving in-loop filter parameters via training for video encoding is provided. A video encoder performs inter prediction for a frame in a set of frames of the video to generate prediction residuals for the frame. The inter prediction for the frame is performed based on a reconstructed frame in the set of frames filtered using an in-loop filter. The value of a parameter of the in-loop filter is determined by determining, for each candidate in-loop filter parameter value, a visual quality metric for a set of training frames in training video sequences filtered by the in-loop filter. The candidate in-loop filter parameter value that corresponds the highest visual quality metric can be selected as the value of the parameter of the in-loop filter. The video encoder further encodes the prediction residues of the frame and the parameter of the in-loop filter into a bitstream representing the video.

20 Claims, 7 Drawing Sheets

(56) References Cited

U.S. PATENT DOCUMENTS

2020/0351533 A1\* 11/2020 Bampis .............. H04N 21/2407
2021/0409744 A1\* 12/2021 Kawamura ............ H04N 19/82
2023/0412800 A1\* 12/2023 Wu ........................ H04N 19/82

OTHER PUBLICATIONS

Lei, et al., "GPGPU Implementation of VP9 In-Loop Deblocking Filter and Improvements for AV1 Codec", ICIP 2017, 2017, pp. 925-929.
Zimichev, "BD-rate: one name—two metrics. AOM vs. the World.", Retrieved from internet on Oct. 17, 2023 from: https://vicuesoft.com/blog/titles/bd_rate_one_name_two_metrics/, 9 pages.

\* cited by examiner

DERIVING IN-LOOP FILTER PARAMETERS FOR VIDEO CODING

CROSS REFERENCE TO RELATED APPLICATIONS

This application claims priority to U.S. Provisional Application No. 63/528,230 filed Jul. 21, 2023, and entitled "Deriving In-Loop Filter Parameters for Video Coding," the entire contents of which are incorporated herein by reference.

FIELD

The present application relates to digital video encoding, for example, encoding that can be used to efficiently send video from one device to another over a network for videoconferencing. More specifically, the present application relates to video encoding to improve coding efficiency by deriving in-loop filter parameters via training while maintaining video quality.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION OF THE DRAWINGS

Figure 1:
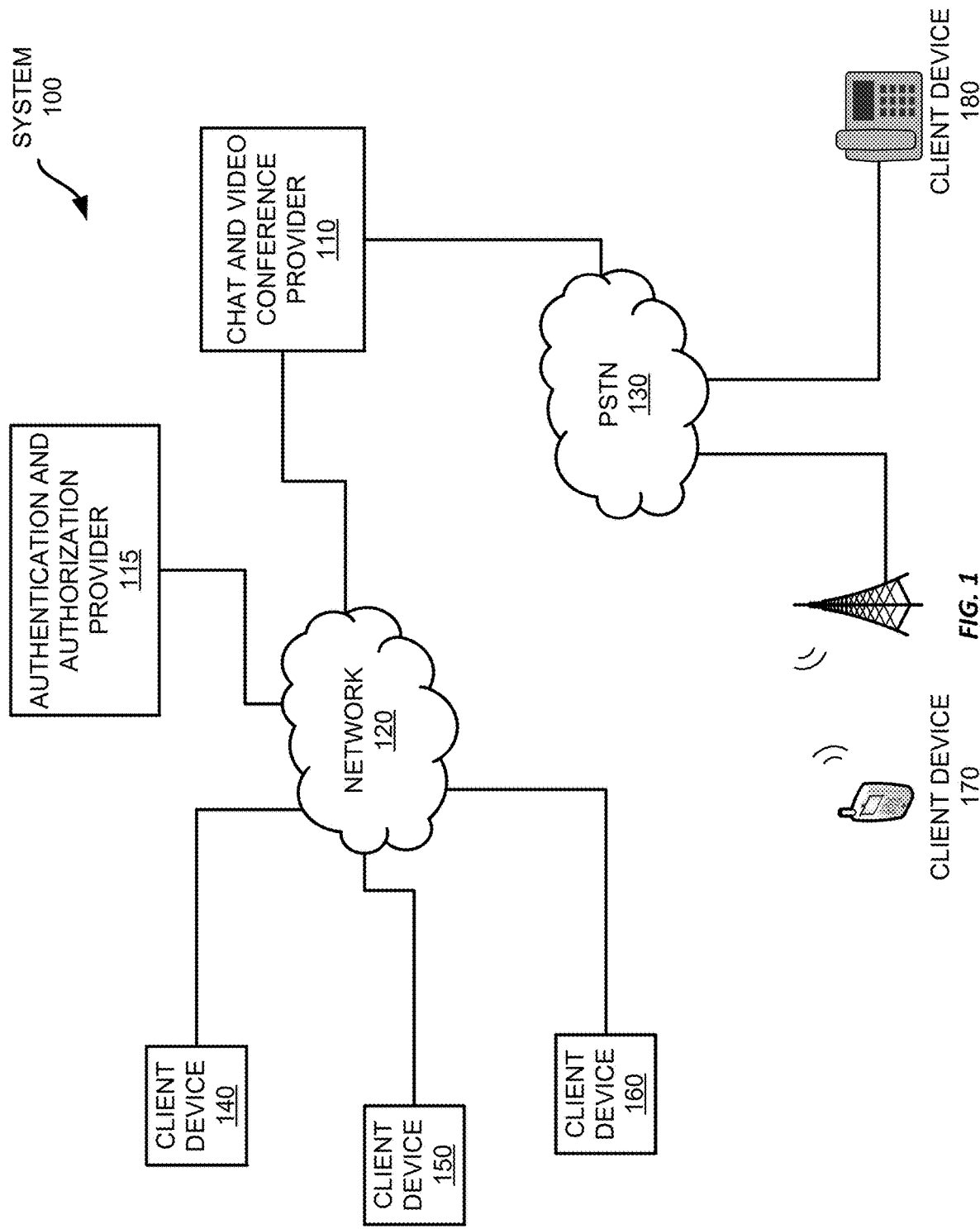
FIG. 1 shows an example of a system for providing videoconferencing and chat functionality to various client devices according to some aspects of the present disclosure.

Examples are described herein in the context of systems and methods for deriving in-loop filter parameters for video coding. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Online conferencing systems enable their users to create and attend conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

During a videoconference, the video streams may undergo some level of compression for various reasons, such as to reduce network bandwidth usage, latency, or lag. This compression is normally performed by a video encoder on the client device that is providing the video stream. After compressing the video stream, the client device transmits the compressed video stream to the other client devices associated with the other participants in the videoconference. Those client devices can then decompress the compressed video stream using their respective video decoders.

Although there are many different kinds of compression techniques, a typical compression process will normally involve an initial blocking operation in which a video frame is divided into superblocks each of which is further divided into rectangular blocks of pixels, which are referred to herein as coding blocks. A coding block can have 128×128 pixels, 64×64 pixels, 32×32 pixels, 8×8 pixels, 4×4 pixels, or other sizes. Each coding block may be predicted using blocks that have been previously encoded, via intra- or inter-prediction. The difference between the predicted values and the original values of a coding block, also referred to as residuals, can be calculated. A transform operation can be performed in which a transform function (e.g., a discrete cosine transform or a discrete wavelet transform) is applied to the residuals in each block, to transform the residuals into frequency-domain coefficients. For example, if a coding block has 8×8 pixels, the transform function would operate on 64 input residual values and yield 64 frequency-domain coefficients. These frequency-domain coefficients can be referred to as frequency residuals, since they represent residuals in the frequency domain, as described in greater detail later on. After the transform operation, a quantization operation can be performed to quantize the frequency residuals. During the quantization operation, each frequency residual is compared to a predefined quantization threshold. Frequency residuals that fall below the quantization threshold are set to zero. Thus, following quantization, more of the frequency residuals may have values of zero than prior to quantization. After the quantization operation, an entropy coding may be performed to reduce the number of bits used to represent the quantized frequency residuals. Examples of entropy coding can include run-length encoding, variable-length encoding, and arithmetic coding.

In order for a block to be used as a reference for a coding block in another frame (e.g., for inter-prediction), the coding block is reconstructed by adding the residue back to the predicted values of the coding block. The resulting reconstructed signal is then processed through an in-loop filtering step. The in-loop filter is configured to reduce ringing artifacts, blocking artifacts at the block boundaries, and other artifacts of reconstructed video frames to improve the video quality. The in-loop filter may be a de-blocking filter, a constrained directional enhancement filter (CDEF), a sample-adaptive offset (SAO) filter, an adaptive loop filter (ALF), etc. The filtered blocks of a picture are stored in a buffer for use in the prediction of other pictures.

To provide higher video quality for users of modern digital telecommunication platforms and applications within the bounds of computing and network limitations, a video-conferencing system according to this disclosure efficiently encodes and decodes video using an in-loop filter with parameters derived through training based on training video sequences. A system according to some examples can receive an input video signal at a client device, for example, a computing device being used to participate in an online video conference. The input video signal may be a video signal from the camera associated with the system to be compressed or a compressed video received from another system to be decompressed. The compression process and the decompression process each involves reconstructing blocks from the compressed blocks. For each reconstructed super block, the in-loop filter with parameters determined through a training process is applied to reduce the blocking artifacts before the superblock is used as reference to encode or decode blocks in other frames of the video.

In some examples, the training process includes determining a set of training video sequences. The training video sequences can be determined based on the type of videos that are processed in the target application. For example, for videoconferencing, the training video sequences can be selected to include the videos of a user sitting in front of a camera. The training video sequences can be further selected to cover various scenarios for the type of videos. For instance, for videoconferencing, the training video sequences can include different types of background (e.g., messy background, clean background, and virtual background), different types of lighting conditions (e.g., dark and bright), and different foreground users (e.g., users of different genders and races wearing different clothes, etc.).

The in-loop filtering parameter (such as the loop_filter_level parameter of the in-loop deblocking filter of the AV1 video codec) for the I-frame (intra-coded frame) can be determined. For a quantization parameter (QP) value of a set of quantization parameter values, different in-loop filter parameter values can be determined. For each in-loop filter parameter value, a set of I-frames are extracted from each training video sequence, and a visual quality metric, such as the peak-signal-to-noise-ratio (PSNR), is calculated for each I-frame. The visual quality metrics for the set of I-frames are combined (e.g., averaged) to determine an average visual quality metric for the corresponding training video sequence. The combined visual quality metrics for multiple training video sequences can be further combined (e.g., averaged) to determine a visual quality metric corresponding to the in-loop filter parameter value. The in-loop filter parameter value that corresponds to the highest visual quality metric is determined as the in-loop filter parameter value for the QP value. The same process can be repeated for other QP values. As a result, the in-loop filter parameter values for corresponding QP values can be determined. The same process can be used to determine separate in-loop filter parameter values for Y, U, and V components of the video. Alternatively, the same in-loop filter parameter value can be used to encode or decode the Y, U, and V components of the video.

For P-frames (predicted frames), the in-loop filter parameter values of the I-frame can be used. Alternatively, or additionally, the in-loop filter parameter values for the P-frames can be determined based on the in-loop filter parameter values of the I-frames. For example, for a QP value, a subset of candidate in-loop filter parameter values can be identified around the neighborhood of the I-frame in-loop filter parameter value. For each of the candidate in-loop filter parameter values in the subset, a rate-distortion performance metric (e.g., BD-rate) is calculated for each of the selected P-frames of a training video sequence. A combined rate-distortion performance metric can be calculated (e.g., via averaging) for each training video sequence, and a further combined (e.g., averaged) rate-distortion performance metric can be calculated for the set of training video sequences. The candidate in-loop filter parameter value that corresponds to the best combined rate-distortion performance metric can be selected for P-frames with the QP value. In further examples, the above process is iteratively repeated until the process converges (e.g., the selected in-loop filter parameter value for P-frames with the QP value remains the same in two or more consecutive iterations). This process can be repeated for each QP value to determine the in-loop filter parameter value for P-frames. Similar to the I-frames, the same process can be used to determine separate in-loop filter parameter values for Y, U, and V components of P-frames of the video. Alternatively, the same in-loop filter parameter value can be used to encode or decode the Y, U, and V components of the P-frames of the video. For B-frames (bi-directionally predicted frame), the in-loop filter parameter corresponding to a QP value can use the parameter values determined for the P-frames discussed above.

The determined in-loop filter parameter values can be used by the encoder to encode the video and transmitted to the decoder to decode the video. A video encoding or decoding that uses the in-loop filter parameters derived as described herein may be used in, as examples, Web-based videoconferencing or videoconferencing applications installed for desktop and notebook computers, or in an "app" (application) for deployment to smartphones or tablet computers.

The techniques disclosed herein for deriving loop filter parameters for video coding via training enable improved coding efficiency while maintaining quality in videoconferences. Because the in-loop filter parameters are derived through training using the training videos similar to the videos to be encoded and decoded in the target application (e.g., videoconferencing), the in-loop filter parameters are more tailored toward the target application and therefore can lead to higher visual quality of the encoded video without increasing the bit rate of the coded video. As a result, the transmission efficiency of the video stream can also be improved.

This illustrative example is given to introduce the reader to the general subject matter discussed herein and the disclosure is not limited to this example. The following sections describe various additional non-limiting examples and examples of systems and methods for deriving loop filter parameters for video coding via training.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
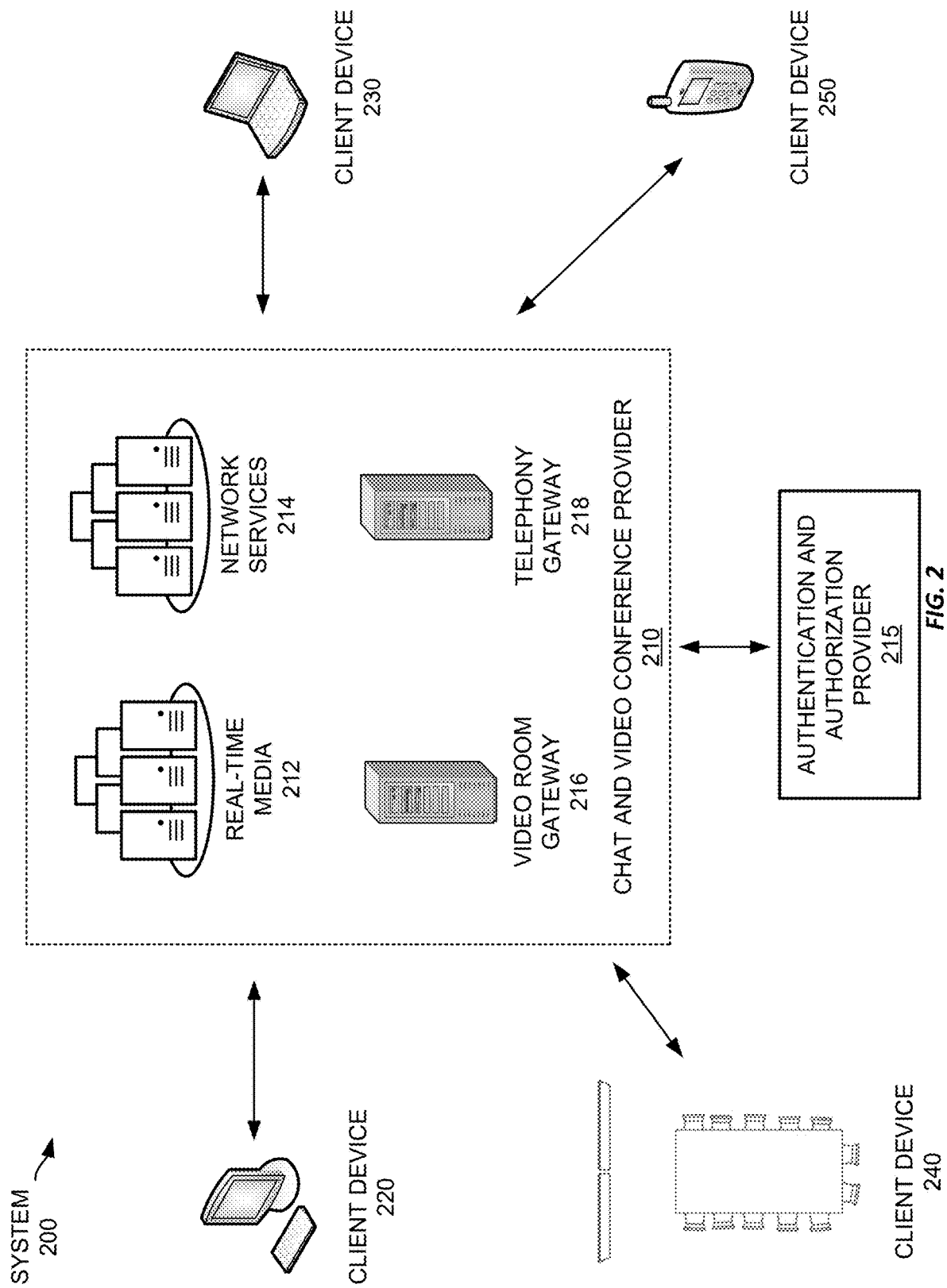
FIG. 2 shows another example of a system for providing videoconferencing and chat functionality to various client devices, according to some aspects of the present disclosure.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellvlar network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellvlar telephones (e.g., cellvlar telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellvlar telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting.

Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
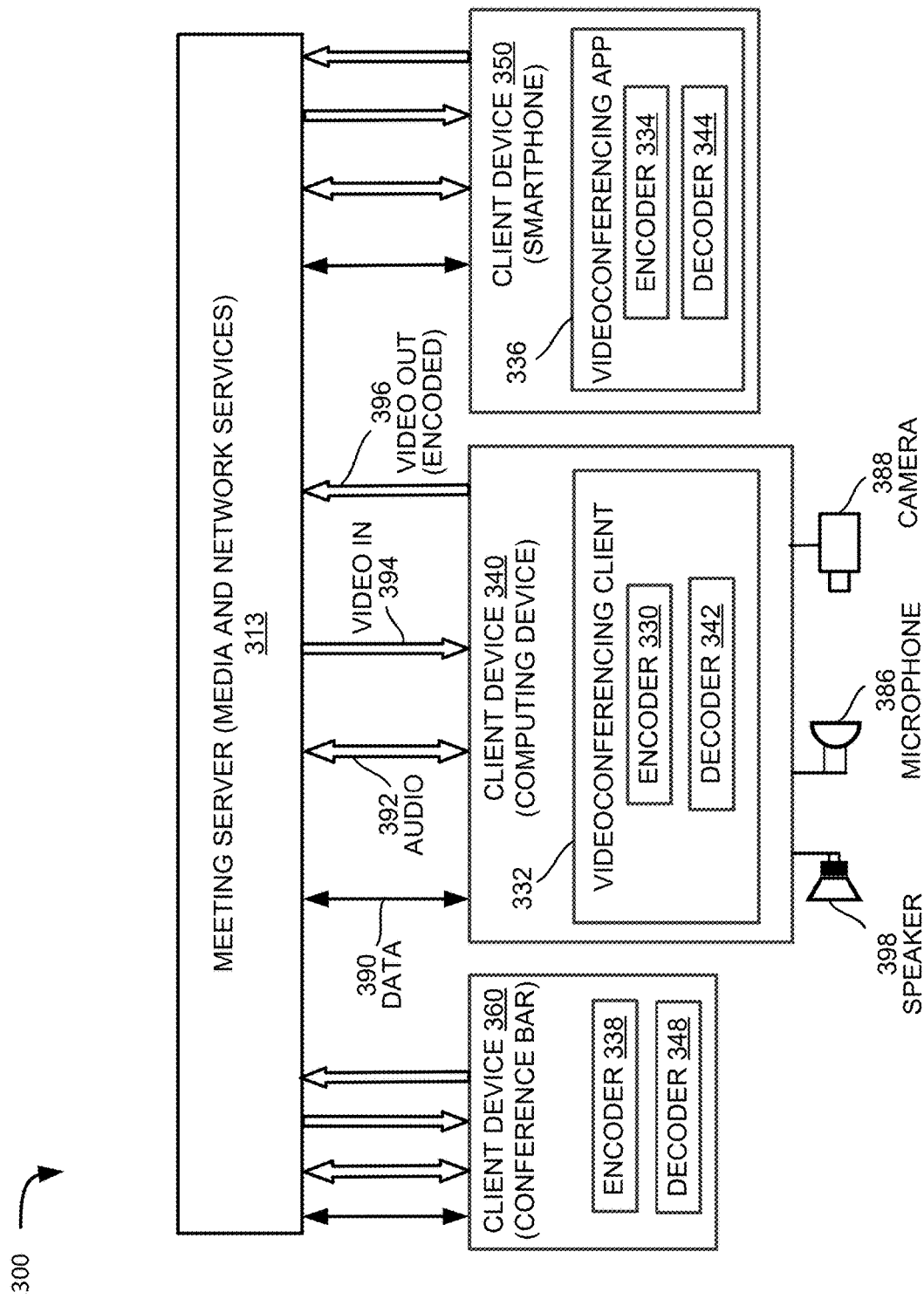
FIG. 3 shows an example of a system for providing videoconferencing functionality among various client devices, according to some aspects of the present disclosure.

Referring to FIG. 3, FIG. 3 shows example system 300. Example system 300 includes videoconferencing meeting server 313. Meeting server 313 may also be referred to as a multimedia router and can be implemented by the real-time media servers 212 working with the network services servers 214. The meeting server can keep track of the status of meetings without constantly exchanging this information with client devices.

System 300 includes an encoder module (encoder) 330 and a decoder module (decoder) 342 maintained on client device 340, which is coupled to meeting server 313 during a videoconferencing meeting. The encoder 330 and decoder 342 are part of a videoconferencing client application 332 installed on client device 340, which in this example is a computing device such as a desktop or notebook computer. An encoder 334 and a decoder 344 are installed in client device 350, which in this example is a smartphone, but can be any suitable client device. Encoder 334 and decoder 344 are part of a videoconferencing app 336. Encoder 338 and decoder 348 are installed in client device 360, which in this example is conference bar, but can be any suitable client device. As an example, conference bar 360 may be used as the dedicated videoconferencing equipment in conference room 240. In some examples, a conference bar is a unitary device that can be wall or desk mounted. A conference bar can include a webcam, speaker, and microphone all in one and often has connections to add conference table speakers and/or microphones. Conference bar 360 in FIG. 3 includes microcode or firmware, which may implement encoder 338 and decoder 348. Alternatively, an encoder chip may be provided in conference bar 360. For purposes of the discussion herein a codec, which is a combination of an encoder and a decoder, may be referred to as an encoder.

The various hardware configurations in use in a system such as system 300 may result in video input signals from various devices. These may include wired webcams connected to local computing devices via USB, cameras internal to notebook computers, tablet computers, smartphones, and conference bars or other kinds of dedicated conference room equipment. Video signals may also be generated internal to a computing device through screen sharing of documents, images, or incoming video feeds. An encoder that provides fast parameter search for chroma from luma intra prediction can be used with any of these sources.

In system 300, client devices maintain an active data connection 390 for any video or audio conference in which the host client device is participating. These data connections are illustrated with the single width, two-headed arrows in FIG. 3. The data connections are used for control, presence indication, chat, and other similar functions and can be maintained using TCP. Additionally, two-way audio streams carry audio between the meeting server 313 and the client devices. The two-way audio streams are shown with a double width, bidirectional arrow such as that shown for audio stream 392. Video received from the meeting server 313 at each client device shown is illustrated with a double-width, single-ended arrow such as that shown for video input from the network to client device 340, video stream 394. Video streams outgoing from the client devices, which are encoded by the encoder modules using fast parameter search for chroma from luma intra prediction, are illustrated by a similar double-width, single-ended arrow such as that shown for outgoing video stream 396. Audio and video streams, including the blocks and frames of outgoing video, can be transmitted over the network using UDP.

The encoders in system 300 can accept video signals originating from a camera connected to, built in to, or otherwise associated with the respective client device. For purposes of this example, client devices 350 and 360 have built-in microphones, speakers, and cameras, while client device 340 has an externally connected microphone 386, an externally connected camera 388, and an externally connected speaker 398. Alternatively, the microphone 386 may be separate from the speaker 398, for example, a desk or boom microphone, or a microphone that is part of the camera 388. A digital stream including encoded video frames is delivered to meeting server 313 after encoding.

Figure 4:
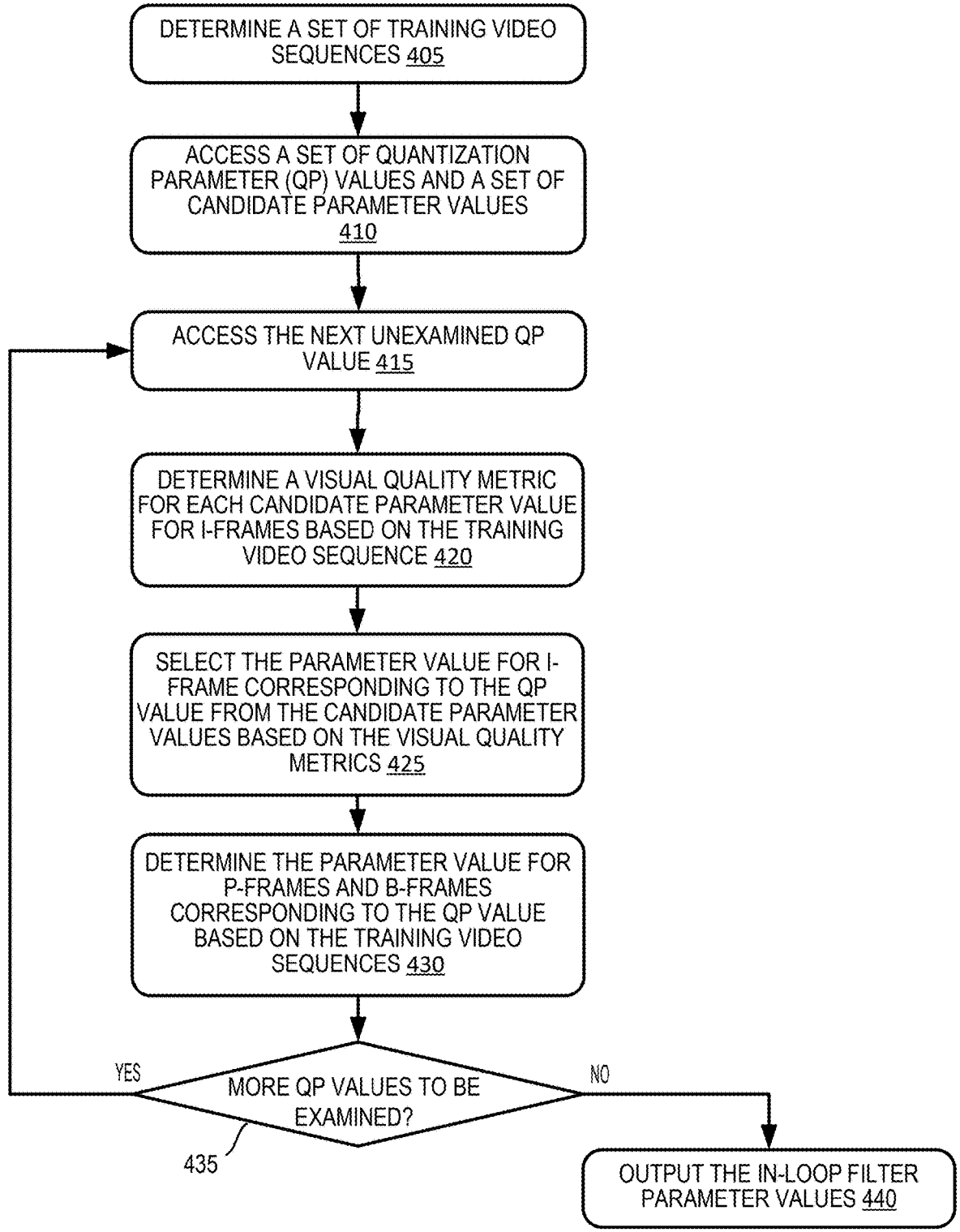
FIG. 4 shows a flowchart of an example of a process deriving loop filter parameters for video coding via training, according to aspects described herein, according to some aspects of the present disclosure.

Referring now to FIG. 4, FIG. 4 shows an example process 400 for deriving loop filter parameters for video coding via training, according to aspects described herein. The process 400 in FIG. 4 may be implemented using a computing system separate from the meeting server or the client device shown in FIGS. 1-3. However, any suitable system according to this disclosure may be used to implement the process 400, such as the example systems shown in FIGS. 1-3.

At block 405, the process 400 involves determining a set of training video sequences. The training video sequences can be determined based on the type of videos that are processed in the target application. For example, for videoconferencing, the training video sequences can be selected to include the videos of a user sitting in front of a camera. The training video sequences can be further selected to cover various scenarios for the type of videos. For instance, for videoconferencing, the training video sequences can include different types of background (e.g., messy background, clean background, and virtual background), different types of lighting conditions (e.g., dark and bright), and different foreground users (e.g., users of different genders and races wearing different clothes, etc.).

At block 410, the process 400 involves accessing a set of quantization parameter (QP) values supported by the video codec and a set of candidate parameter values that can be used for the parameter of the in-loop filter of the video codec. The parameter can be, for example, the loop_filter_level parameter of the in-loop deblocking filter of the AV1 video codec or any other parameter of an in-loop filter, such as the loop_filter_sharpness parameter.

For instance, the loop_filter_level parameter lvl can be used to determine limit values limit and blimit, and a threshold value thresh. The limit values are used to determine if any filtering should occur based on differences of adjacent pixels near a block boundary. The threshold value is used to determine whether pixels on at least one side of the block boundary have high edge variance. Based on these determinations, the pixels along the transformed block boundary can be filtered using pixels on both sides of the block boundary. Depending on the size of the transformed block, different filters can be used to perform the deblocking filter, such as a 4-tap filter for 4×4 transformed blocks, an 8-tap filter for 8×8 transformed blocks and so on.

More specifically, the limit values limit, blimit, and the threshold value thresh can be determined by:

$$\text{limit} = \begin{cases} \text{clip3}\left(1, 9 - \text{sharpness}, \dfrac{lvl}{2^{shift}}\right), & \text{sharpness} > 0; \\ \max\left(1, \dfrac{lvl}{2^{shift}}\right), & \text{otherwise}; \end{cases} \quad (1)$$

$$\text{blimit} = 2 \times (lvl + 2) + \text{limit}; \text{thresh} = \dfrac{lvl}{16}. \text{ where}$$

$$\text{shift} = \begin{cases} 1, & 0 < \text{sharpness} \le 4 \\ 2, & \text{sharpness} > 4 \\ 0, & \text{otherwise} \end{cases} \quad (2)$$

$$\text{clip3}(x, y, z) = \begin{cases} x; & z < x \\ y; & z > y \\ z; & \text{otherwise} \end{cases}.$$

A mask filter_mask can be used to indicate whether adjacent pixels close to the edge vary by less than the limits specified by limit and blimit, thereby determining whether filtering should occur. filter_mask can be determined to be equal to 1 if all of the following are false for i from 1 to 3:

$$|p_i - p_{i-1}| > \text{limit}, i = 1, \ldots, 3 \quad (3)$$

$$|q_i - q_{i-1}| > \text{limit}, i = 1, \ldots, 3$$

$$\left(|p_0 - q_0| \times 2 + \dfrac{|p_1 - q_1|}{2} > \text{blimit}.\right.$$

Figure 5:
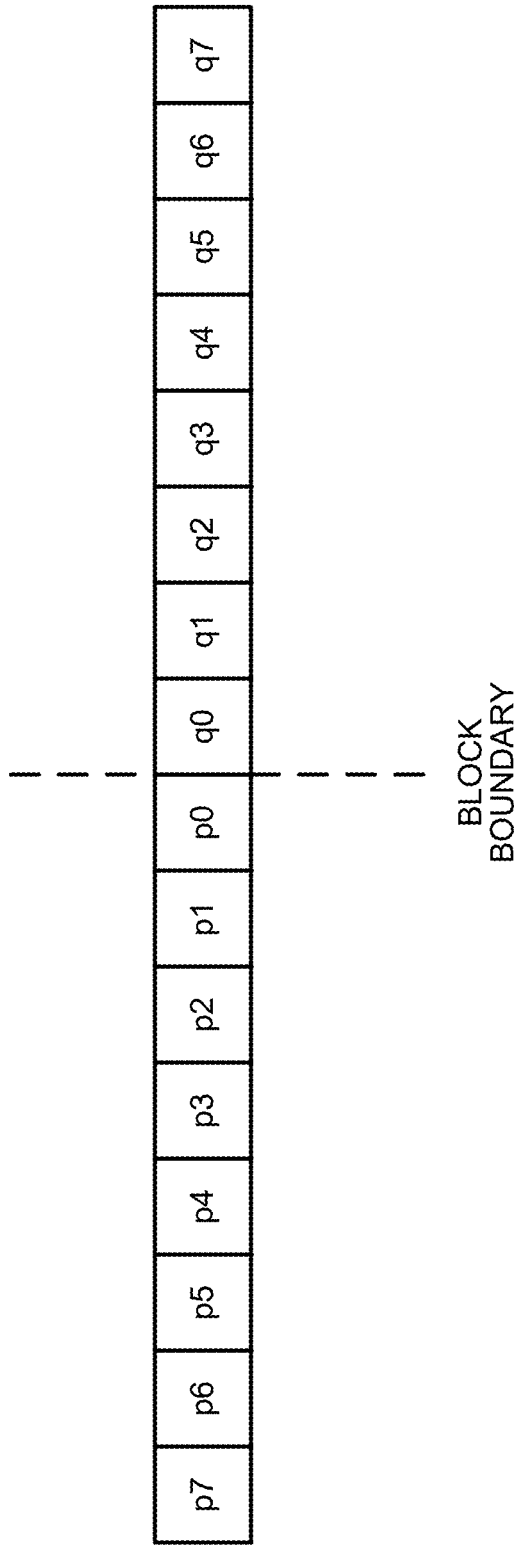
FIG. 5 shows an example of pixels near a block boundary involved in the in-loop filtering of a video frame according to some aspects of the present disclosure.

Here, $p_i$ and $q_i$ are the neighboring pixels near the block boundary as shown in FIG. 5. A mask hev_mask can be used to indicate whether the pixel has high edge varian and can be determined as equal to 1 when either of the following is true:

$$|p_1 - p_0| > \text{thresh} | q_1 - q_0 | > \text{thresh} \quad (4)$$

Other masks can also be determined for the in-loop filter, such as a flat_mask_narrow and a flat_mask_wide to determine whether pixels from each side of the block boundary are in a flat region. The flat_mask_narrow can be determined to be 1 if both of the following are false for i from 1 to 3:

$$|p_i - p_0| > 1, i=1, \ldots, 3 \quad |q_i - q_0| > 1, i=1, \ldots, 3 \quad (5)$$

flat_mask_wide can be determined to be true if both of the following are false for i from 1 to 7:

$$|p_i - p_0| > 1, i=1, \ldots, 7, |q_i - q_0| > 1, i=1, \ldots, 7. \quad (6)$$

Based on the determined masks, the pixels long the transform block boundary can be filtered. For a 4×4 transform block, the left and above boundaries can be determined by a 4-tap filter as follows:

$$\text{round2}(x, n) = (x + (1 \ll (n - 1))) \gg n \quad (7)$$

$$\text{clamp}(\text{value}) = \text{clip3}(-128, 128, \text{value})$$

$$ps_1 = p_1 - 128, \; ps_0 = p_0 - 128$$

$$qs_0 = q_0 - 128, \; qs_1 = q_1 - 128$$

$$\Delta = \begin{cases} \text{clamp}(ps_1 - qs_1), & \text{hev\_mask} = 1 \\ 0, & \text{hev\_mask} = 0 \end{cases}$$

$$\Delta_0 = \text{clamp}(\Delta + 3 \times (qs_0 - ps_0))$$

$$\Delta_1 = \frac{\text{clamp}(\Delta_0 + 4)}{8}$$

$$\Delta_2 = \frac{\text{clamp}(\Delta_0 + 3)}{8}$$

$$\Delta_3 = \text{round2}(\Delta_1, 1)$$

$$q'_0 = \text{clamp}(qs_0 - \Delta_1) + 128$$

$$p'_0 = \text{clamp}(ps_0 - \Delta_2) + 128$$

$$q'_1 = \begin{cases} \text{clamp}(qs_1 - \Delta_3) + 128, & \text{hev\_mask} = 0 \\ 0, & \text{hev\_mask} = 1 \end{cases}$$

$$p'_1 = \begin{cases} \text{clamp}(ps_1 - \Delta_3) + 128, & \text{hev\_mask} = 0 \\ p_1, & \text{hev\_mask} = 1 \end{cases}$$

where $q_0'$, $p_0'$, $q_1'$, $p_1'$ are the filtered pixel at positions $q_0$, $p_0$, $q_1$, $p_1$.

For an 8×8 transform block, if the pixels are not in a flat area, the above 4-tap filter is used to filter the pixel. If the pixels are determined to be in a flat area (flat_mask_narrow=1), a 7-tap filter is used to filter the pixels. The 7-tap filter evaluates 4 pixels on each side of the edge and modifies up to 3 pixels on each side of the edge. The filter taps are [1, 1, 1, 2, 1, 1, 1]. The filtering is performed as follows:

$$p_2'=\text{round2}(p_3+p_3+p_3+2\times p_2+p_1+p_0+q_0,3) p_1'=\text{round2}$$
$$(p_3+p_3+p_2+2\times p_1+p_0+q_0+q_1,3) \; p_0'=\text{round2}(p_3+$$
$$p_2+p_1+2\times p_0+q_0+q_1+q_2,3) q_1'=\text{round2}(p_2+p_1+p_0+$$
$$2\times q_0+q_1+q_2+q_3,3) q_1'=\text{round2}(p_1+p_0+q_0+2\times q_1+$$
$$q_2+q_3+q_3,3) q_2=\text{round2}(p_0+q_0+q1+2\times 92+93+93+$$
$$93,3) \quad (8)$$

For a 16×16 or 32×32 transform block, if the pixels are not in narrow flat area (flat_mask_narrow=0) or wide flat area (flat_mask_wide=0), the above 4-tap filter is used. Otherwise, if the pixels are in a narrow flat area (flat_mask_narrow=1) but not in a wide flat area (flat_mask_wide=0), the above 7-tap filter is used. If the pixels are in a wide flat area (flat_mask_wide=1), a 15-tap filter is used to filter the pixels. The filter evaluates 8 pixels on each side of the edge and modifies up to 7 pixels on each side of the edge. The filter taps are [1, 1, 1, 1, 1, 1, 1, 2, 1, 1, 1, 1, 1, 1, 1] and the filtering is performed similar to the 7-tap filter.

At block 415, the process 400 involves accessing the next unexamined QP value in the set of QP values. At block 420, the process 400 involves determining a visual quality metric for each candidate parameter value in the set of candidate parameter values for I-frames based on the training video sequences. For example, multiple I-frames can be identified from each of the training video sequences. For each I-frame, a frame-level visual quality metric, such as the peak signal to noise ratio (PSNR) can be determined to measure the visual quality of the filtered frame compared with the original unfiltered frame. For example, the PSNR can be defined via the mean squared error (MSE). Denote the original unfiltered frame of size m×n as/and the filtered frame as K, the MSE is defined as:

$$MSE = \frac{1}{mn} \sum_{i=0}^{m-1} \sum_{j=0}^{n-1} [I(i, j) - K(i, j)]^2. \quad (9)$$

The PSNR (in dB) is defined as $$PSNR = 10 \cdot \log_{10}\left(\frac{MAX_I^2}{MSE}\right). \quad (10)$$

Here, $MAX_I$ is the maximum possible pixel value of the frame. For an 8-bit frame, this maximum value is 255. For color frames, the MSE is calculated based on the differences in all color components.

As an example, the in-loop filter can be configured with a candidate parameter value and used to filter an I-frame. The frame-level visual quality metric can be calculated based on the filtered frame and original frame. As a result, a frame-level visual quality metric is calculated for each of the I-frames in a training video sequence and an average or other form of combination of the frame-level visual quality metric can be calculated for the training video sequence. The same process can be repeated for other training video sequences to generate multiple combined frame-level visual quality metrics. These combined visual quality metrics can be further combined (e.g., averaged) to generate the visual quality metric for the candidate parameter value. A similar process can be utilized to generate the visual quality metric for other candidate parameter values.

At block 425, the process 400 involves selecting the in-loop filter parameter value for I-frames that corresponds to the current QP value. Among the visual quality metrics determined at block 420, the one with the highest value (i.e., the value indicating the best visual quality) can be selected and the corresponding candidate parameter value can be selected as the parameter value for the in-loop filter that corresponds to the current QP value.

At block 430, the process 400 involves determining the in-loop filter parameter value for P-frames and B-frames that corresponds to the current QP value. In some examples, the in-loop filter parameter value for P-frames and B-frames is set to be same as the parameter value for I-frames. In alternative or additional examples, the parameter value for P-frames and B-frames is determined based on the parameter value for I-frames.

For example, a subset of the candidate parameter values can be selected from the set of candidate parameter values near the neighborhood of the parameter value determined for I-frames at block 425. Further, multiple P-frames (or B-frames) can be selected from each of the training video sequences. For each of the candidate parameter values in the subset, a frame-level rate-distortion performance metric, such as the BD-rate (Bjontegaard delta rate), can be calculated for each of the selected P-frames (or B-frames) of a training video sequence. These frame-level rate-distortion performance metrics can be combined (e.g., through averaging) for each training video sequence, and a further combined rate-distortion performance metric can be calculated for the set of training video sequences by combining the rate-distortion performance metrics from different training video sequences. The candidate in-loop filter parameter value that corresponds to the best combined rate-distortion performance metric can be selected for P-frames (or B-frames).

In further examples, the above process is iteratively repeated by determining another subset of candidate parameter values around the neighborhood of the determined parameter value and performing the same process to determine an updated parameter value. This iterative process can be stopped if the process converges (e.g., the selected in-loop filter parameter value for P-frames (or B-frames) remains the same in two or more consecutive iterations).

In some examples, blocks 420-430 are repeated for each of the Y, U, and V components of the video to determine separate in-loop filter parameter values for the respective components. Alternatively, the same in-loop filter parameter value can be determined for the Y, U, and V components of the video.

At block 435, the process 400 involves determining whether there are more QP values to be examined. If so, the process 400 returns to block 415 to process the next unexamined QP value; otherwise, the process 400 involves outputting the determined in-loop filter parameter values for different QP values at block 440. In the example where the in-loop filter parameter is loop_filter_level as discussed above, the larger the QP value, the larger the in-loop filter parameter value is.

As discussed above, the determined in-loop filter parameter values can be used by a video encoder or a video decoder during the coding process. For example, to encode a set of frames of a video, a video encoder (such as the video encoder shown in FIG. 3) can encode one or more I-frames, such as through intra-prediction, transformation, and quantization of prediction residuals of coding blocks of the I-frames. The coded I-frames can be used as reference frames for P-frames and B-frames in the video. To generate the reference frames, the coded I-frames can be reconstructed through de-quantization, inverse transformation, and reconstruction. To improve the visual quality of the encoded video, the reconstructed I-frames are filtered by an in-loop filter to reduce blocking artifacts in the reconstructed I-frames before being used as the reference frames for P-frames or B-frames. One or more parameters of the in-loop filter, such as the loop_filter_level, can be set to the parameter value determined for I-frame according to FIG. 4 based on the QP value of the frame.

Likewise, P-frames and B-frames may also be used as reference frames for other P-frames or B-frames during the inter-prediction. P-frames and B-frames can thus be reconstructed, and the reconstructed P-frames and B-frames are also filtered by an in-loop filter before being used as a reference frame. The one or more parameters of the in-loop filter, such as the loop_filter_level, can be set to the parameter value determined for a P-frame or B-frame according to FIG. 4 based on the QP value of the frame. The residue of the inter-predicted frames can be encoded into the bitstream of the video, such as through transform, quantization, and entropy coding.

Similarly, a video decoder (such as video decoders implemented in respective client devices shown in FIG. 3) also needs to reconstruct I-frames, P-frames, or B-frames to generate reference frames for other P-frames and B-frames to perform inter-prediction including motion compensation. The reconstructed frames can be similarly filtered by the in-loop filter using the parameter values determined according to process 400 described above.

Figure 6:
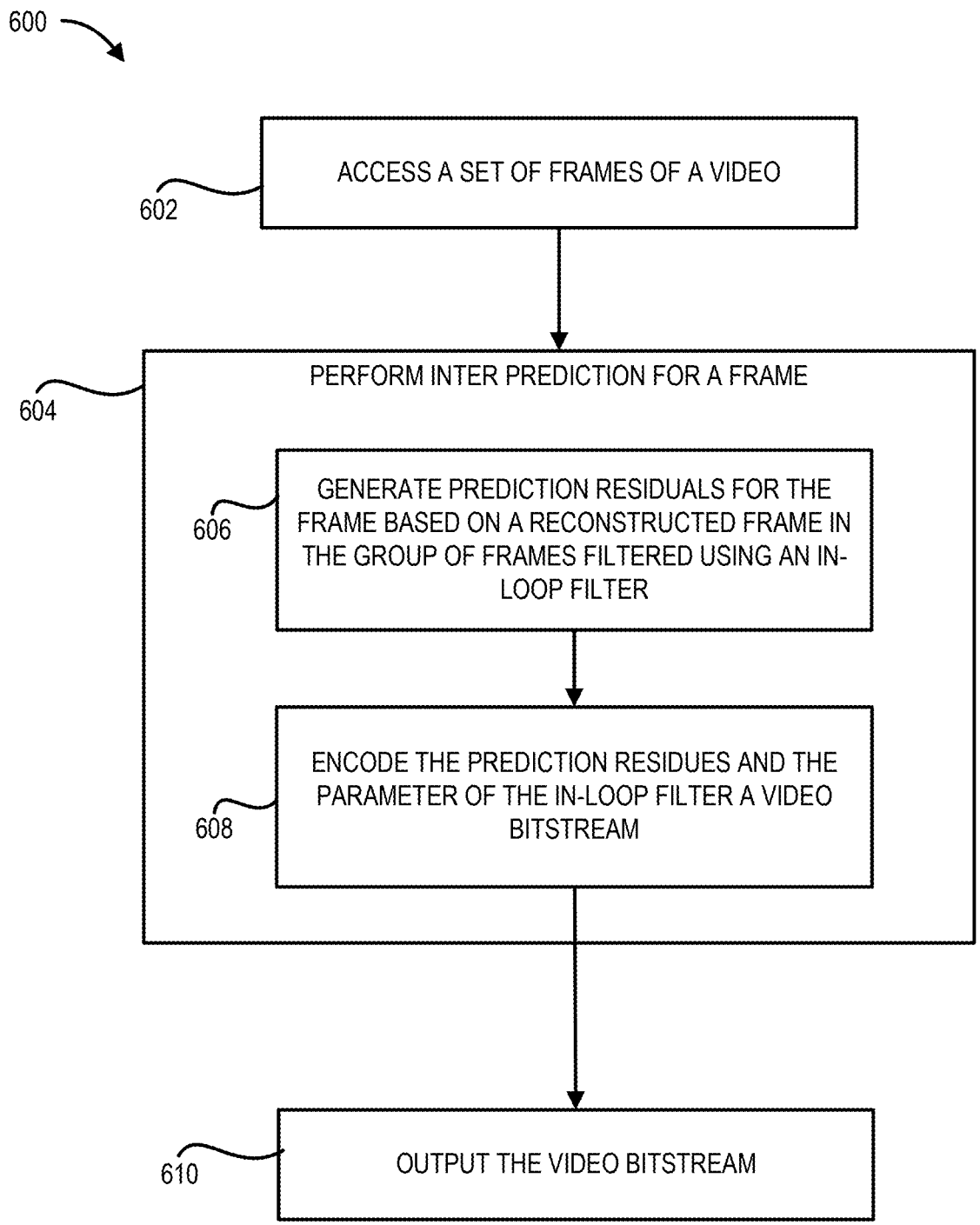
FIG. 6 shows a flowchart of an example of a process for encoding a video with loop filters whose parameters are derived via training according to some aspects of the present disclosure.

Referring now to FIG. 6, FIG. 6 shows a flowchart of an example of a process 600 for encoding a video with loop filters whose parameters are derived via training according to some aspects of the present disclosure. Other examples may involve more steps, fewer steps, different steps, or a different sequence of steps than is shown in FIG. 6. The steps of FIG. 6 can be performed by a processor of a client device, such as any of the client devices 140-170 of FIG. 1, the client devices 220-240 of FIG. 2 and the client devices 340-360 of FIG. 3. In some examples, the steps of FIG. 6 may be performed by a video encoder (e.g., video encoder 330, 334, 338) executing on the processor.

At block 602, the video encoder accesses a set of frames of a video, such as a group of pictures (GOP). The encoder can access the video frames from any suitable source, such as a camera coupled to the client device. In some examples involving a videoconference, the video frames may be captured by a webcam coupled to the client device, where client device can be operated by a participant in the videoconference. The video frame may depict the participant as well as other objects.

At block 604, which includes blocks 606-608, the process 600 involves performing inter prediction for a frame of the set of frames. Some frames (e.g., I-frames) in the set of frames have been encoded using intra predictions and the frame to be encoded using inter prediction can be a P-frame or a B-frame. At block 606, the encoder generates prediction residuals for the frame based on a reconstructed frame in the set of frames that is filtered using an in-loop filter. The reconstructed frame can be generated by processing a coded I-frame through de-quantization, inverse transformation, and reconstruction. The reconstructed frame is further filtered by an in-loop filter to reduce blocking artifacts in the reconstructed frame before being used as the reference frame for P-frames or B-frames in the inter prediction. The parameter of the in-loop filter can be determined using the process illustrated in FIG. 4 based on the QP value of the frame. The prediction residuals for blocks of the frame are generated as the differences between the predicted blocks and the blocks in the original frame.

At block 608, the encoder encodes the prediction residues and the parameter of the in-loop filter in a video bitstream for the video. Each prediction residual block can be encoded into the video bitstream as discussed above. The parameter of the in-loop filter can be encoded into the video bitstream by representing the parameter using an index or a binary representation of the value of the parameter. Blocks 606 and 608 may be repeated for other frames in the set of frames. At block 610, the encoded video bitstream can be output, for example, for transmitting over a network or for storage.

Figure 7:
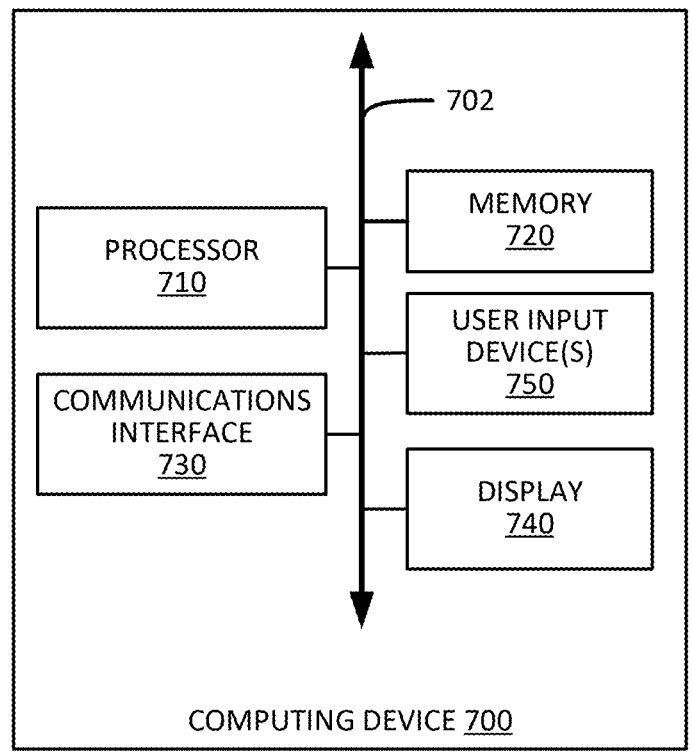
FIG. 7 shows a block diagram of an example of a computing device usable to implement some aspects of the present disclosure.

Referring now to FIG. 7, FIG. 7 shows an example computing device 700 suitable for use in example systems or methods for deriving loop filter parameters for video coding as described herein. The example computing device 700 includes a processor 710 which is in communication with the memory 720 and other components of the computing device 700 using one or more communications buses 702. The processor 710 is configured to execute processor-executable instructions stored in the memory 720 to perform one or more methods for deriving loop filter parameters for video coding. The computing device, in this example, also includes one or more user input devices 750, such as a keyboard, mouse, touchscreen, video input device (e.g., one or more cameras), microphone, etc., to accept user input, for example user input directed to activating or interacting with a videoconferencing application such as videoconferencing client device 340 or videoconferencing app 336. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in at least one memory device, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: a method for encoding a video, the method comprising: accessing a plurality of frames of the video; performing inter prediction for a frame in the plurality of frames to generate prediction residuals for the frame, wherein the inter prediction for the frame is performed based on a reconstructed frame in the plurality of frames filtered using an in-loop filter, wherein a value of a parameter of the in-loop filter is determined by: for each candidate in-loop filter parameter value among a plurality of candidate in-loop filter parameter values, determining a visual quality metric for a plurality of training frames in one or more training video sequences filtered by the in-loop filter with the candidate in-loop filter parameter value, and selecting a candidate in-loop filter parameter value among the plurality of candidate in-loop filter parameter values that corresponds a visual quality metric higher than another visual quality metric as the value of the parameter of the in-loop filter; and encoding the prediction residues of the frame and the parameter of the in-loop filter into a bitstream representing the video.

Example #2: the method of Example #1, wherein determining the visual quality metric for the plurality of training frames in one or more training video sequences filtered by the in-loop filter with the candidate in-loop filter parameter value comprises: for each training frame in the plurality of training frames, determining a frame-level visual quality metric for the training frame filtered by the in-loop filter with the value of the candidate in-loop filter parameter; and combining the frame-level visual quality metrics for the respective training frames to generate the visual quality metric.

Example #3: the method of Examples #1-2, wherein the value of the parameter of the in-loop filter is determined for a corresponding quantization parameter used in encoding the frame.

Example #4: the method of Examples #1-3, wherein the reconstructed frame is an intra-coded frame (I-frame) and the plurality of training frames comprise I-frames.

Example #5: the method of Examples #1-4, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

Example #6: the method of Examples #1-5, wherein the value of the parameter of the in-loop filter for a Y component of the video is determined separately from the value of the parameter for a U component of the video or a V component of the video.

Example #7: the method of Examples #1-6, wherein the visual quality metric comprises a peak signal to noise ratio (PSNR).

Example #8: a system comprising: a processor; and at least one memory device including instructions that are executable by the processor to cause the processor to: access a plurality of frames of a video; perform inter prediction for a frame in the plurality of frames to generate prediction residuals for the frame, wherein the inter prediction for the frame is performed based on a reconstructed frame in the plurality of frames filtered using an in-loop filter, wherein a value of a parameter of the in-loop filter is determined by: for each candidate in-loop filter parameter value among a plurality of candidate in-loop filter parameter values, determine a visual quality metric for a plurality of training frames in one or more training video sequences filtered by the in-loop filter with the candidate in-loop filter parameter value, and select a candidate in-loop filter parameter value among the plurality of candidate in-loop filter parameter values that corresponds a visual quality metric higher than another visual quality metric as the value of the parameter of the in-loop filter; and encode the prediction residues of the frame and the parameter of the in-loop filter into a bitstream representing the video.

Example #9: the system of Example #8, wherein determining the visual quality metric for the plurality of training frames in one or more training video sequences filtered by the in-loop filter with the candidate in-loop filter parameter value comprises: for each training frame in the plurality of training frames, determining a frame-level visual quality metric for the training frame filtered by the in-loop filter with the value of the candidate in-loop filter parameter; and combining the frame-level visual quality metrics for the respective training frames to generate the visual quality metric.

Example #10: the system of Examples #8-9, wherein the value of the parameter of the in-loop filter is determined for a corresponding quantization parameter used in encoding the frame.

Example #11: the system of Examples #8-10, wherein the reconstructed frame is an intra-coded frame (I-frame) and the plurality of training frames comprise I-frames.

Example #12: the system of Examples #8-11, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

Example #13: the system of Examples #8-12, wherein the value of the parameter of the in-loop filter for a Y component of the video is determined separately from the value of the parameter for a U component of the video or a V component of the video.

Example #14: the system of Examples #8-13, wherein the visual quality metric comprises a peak signal to noise ratio (PSNR).

Example #15: a non-transitory computer-readable medium comprising program code that is executable by one or more processors to cause the one or more processors to: access a plurality of frames of a video; perform inter prediction for a frame in the plurality of frames to generate prediction residuals for the frame, wherein the inter prediction for the frame is performed based on a reconstructed frame in the plurality of frames filtered using an in-loop filter, wherein a value of a parameter of the in-loop filter is determined by: for each candidate in-loop filter parameter value among a plurality of candidate in-loop filter parameter values, determine a visual quality metric for a plurality of training frames in one or more training video sequences filtered by the in-loop filter with the candidate in-loop filter parameter value, and select a candidate in-loop filter parameter value among the plurality of candidate in-loop filter parameter values that corresponds a visual quality metric higher than another visual quality metric as the value of the parameter of the in-loop filter; and encode the prediction residues of the frame and the parameter of the in-loop filter into a bitstream representing the video.

Example #16: the non-transitory computer-readable medium of Example #15, wherein determining the visual quality metric for the plurality of training frames in one or more training video sequences filtered by the in-loop filter with the candidate in-loop filter parameter value comprises: for each training frame in the plurality of training frames, determining a frame-level visual quality metric for the training frame filtered by the in-loop filter with the value of the candidate in-loop filter parameter; and combining the frame-level visual quality metrics for the respective training frames to generate the visual quality metric.

Example #17: the non-transitory computer-readable medium of Examples #15-16, wherein the value of the parameter of the in-loop filter is determined for a corresponding quantization parameter used in encoding the frame.

Example #18: the non-transitory computer-readable medium of Examples #15-17, wherein the reconstructed frame is an intra-coded frame (I-frame) and the plurality of training frames comprise I-frames.

Example #19: the non-transitory computer-readable medium of Examples #15-18, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

Example #20: the non-transitory computer-readable medium of Examples #15-19, wherein the value of the parameter of the in-loop filter for a Y component of the video is determined separately from the value of the parameter for a U component of the video or a V component of the video.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C. Further, ranges and limits described herein can include the concept of equality. Hence phrases like "less than" or "more than" can include "less than or equal to" and "more than or equal to" and a range of "from A to B" can include either or both of A and B.

That which is claimed is:

1. A method for encoding a video, the method comprising:
accessing a plurality of frames of the video;
performing inter prediction for a frame in the plurality of frames to generate prediction residuals for the frame, wherein the inter prediction for the frame is performed based on a reconstructed frame in the plurality of frames filtered using an in-loop filter, wherein determining a value of a parameter of the in-loop filter comprises:
for each candidate in-loop filter parameter value among a plurality of candidate in-loop filter parameter values, determining a visual quality metric for a plurality of training frames in one or more training video sequences filtered by the in-loop filter with the candidate in-loop filter parameter value, and
selecting a candidate in-loop filter parameter value among the plurality of candidate in-loop filter parameter values that corresponds a visual quality metric higher than another visual quality metric as the value of the parameter of the in-loop filter; and
encoding the prediction residues of the frame and the parameter of the in-loop filter into a bitstream representing the video.

2. The method of claim 1, wherein determining the visual quality metric for the plurality of training frames in one or more training video sequences filtered by the in-loop filter with the candidate in-loop filter parameter value comprises:
for each training frame in the plurality of training frames, determining a frame-level visual quality metric for the training frame filtered by the in-loop filter with the value of the candidate in-loop filter parameter; and
combining the frame-level visual quality metrics for the respective training frames to generate the visual quality metric.

3. The method of claim 1, wherein the value of the parameter of the in-loop filter is determined for a corresponding quantization parameter used in encoding the frame.

4. The method of claim 1, wherein the reconstructed frame is an intra-coded frame (I-frame) and the plurality of training frames comprise I-frames.

5. The method of claim 1, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

6. The method of claim 1, wherein the value of the parameter of the in-loop filter for a Y component of the video is determined separately from the value of the parameter for a U component of the video or a V component of the video.

7. The method of claim 1, wherein the visual quality metric comprises a peak signal to noise ratio (PSNR).

8. A system comprising:
a processor; and
at least one memory device including instructions that are executable by the processor to cause the processor to:
access a plurality of frames of a video;
perform inter prediction for a frame in the plurality of frames to generate prediction residuals for the frame, wherein the inter prediction for the frame is performed based on a reconstructed frame in the plurality of frames filtered using an in-loop filter, wherein determining a value of a parameter of the in-loop filter comprises:
for each candidate in-loop filter parameter value among a plurality of candidate in-loop filter parameter values, determine a visual quality metric for a plurality of training frames in one or more training video sequences filtered by the in-loop filter with the candidate in-loop filter parameter value, and
select a candidate in-loop filter parameter value among the plurality of candidate in-loop filter parameter values that corresponds a visual quality metric higher than another visual quality metric as the value of the parameter of the in-loop filter; and
encode the prediction residues of the frame and the parameter of the in-loop filter into a bitstream representing the video.

9. The system of claim 8, wherein determining the visual quality metric for the plurality of training frames in one or more training video sequences filtered by the in-loop filter with the candidate in-loop filter parameter value comprises:
for each training frame in the plurality of training frames, determining a frame-level visual quality metric for the training frame filtered by the in-loop filter with the value of the candidate in-loop filter parameter; and
combining the frame-level visual quality metrics for the respective training frames to generate the visual quality metric.

10. The system of claim 8, wherein the value of the parameter of the in-loop filter is determined for a corresponding quantization parameter used in encoding the frame.

11. The system of claim 8, wherein the reconstructed frame is an intra-coded frame (I-frame) and the plurality of training frames comprise I-frames.

12. The system of claim 8, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

13. The system of claim 8, wherein the value of the parameter of the in-loop filter for a Y component of the video is determined separately from the value of the parameter for a U component of the video or a V component of the video.

14. The system of claim 8, wherein the visual quality metric comprises a peak signal to noise ratio (PSNR).

15. A non-transitory computer-readable medium comprising program code that is executable by one or more processors to cause the one or more processors to:
access a plurality of frames of a video;
perform inter prediction for a frame in the plurality of frames to generate prediction residuals for the frame, wherein the inter prediction for the frame is performed based on a reconstructed frame in the plurality of frames filtered using an in-loop filter, wherein determining a value of a parameter of the in-loop filter comprises:
for each candidate in-loop filter parameter value among a plurality of candidate in-loop filter parameter values, determine a visual quality metric for a plurality of training frames in one or more training video sequences filtered by the in-loop filter with the candidate in-loop filter parameter value, and
select a candidate in-loop filter parameter value among the plurality of candidate in-loop filter parameter values that corresponds a visual quality metric higher than another visual quality metric as the value of the parameter of the in-loop filter; and encode the prediction residues of the frame and the parameter of the in-loop filter into a bitstream representing the video.

16. The non-transitory computer-readable medium of claim 15, wherein determining the visual quality metric for the plurality of training frames in one or more training video sequences filtered by the in-loop filter with the candidate in-loop filter parameter value comprises:

for each training frame in the plurality of training frames, determining a frame-level visual quality metric for the training frame filtered by the in-loop filter with the value of the candidate in-loop filter parameter; and combining the frame-level visual quality metrics for the respective training frames to generate the visual quality metric.

17. The non-transitory computer-readable medium of claim 15, wherein the value of the parameter of the in-loop filter is determined for a corresponding quantization parameter used in encoding the frame.

18. The non-transitory computer-readable medium of claim 15, wherein the reconstructed frame is an intra-coded frame (I-frame) and the plurality of training frames comprise I-frames.

19. The non-transitory computer-readable medium of claim 15, wherein the reconstructed frame filtered using the in-loop filter is a predicted frame (P-frame), and wherein determining the value of the parameter of the in-loop filter further comprises determining a value of the parameter of the in-loop filter for P-frames based on the selected candidate in-loop filter parameter value.

20. The non-transitory computer-readable medium of claim 15, wherein the value of the parameter of the in-loop filter for a Y component of the video is determined separately from the value of the parameter for a U component of the video or a V component of the video.

* * * * *